A. H. FETZER.
UNIVERSAL JOINT.
APPLICATION FILED JUNE 3, 1910.
1,021,923.
Patented Apr. 2, 1912.
2 SHEETS—SHEET 2.
Fig. 5.
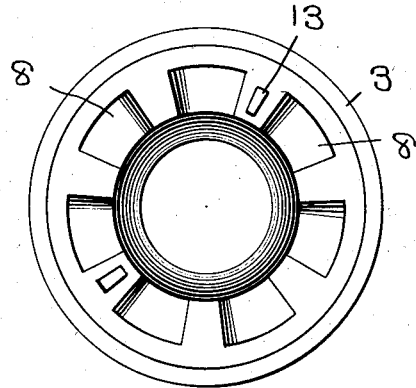
Fig. 4.
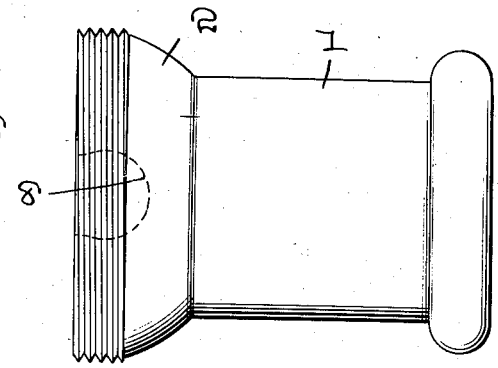
Fig. 6.   Fig. 7.   Fig. 8.
 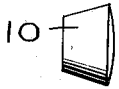 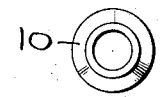
WITNESSES:
INVENTOR
A. H. Fetzer
BY
W. J. FitzGerald
Attorneys

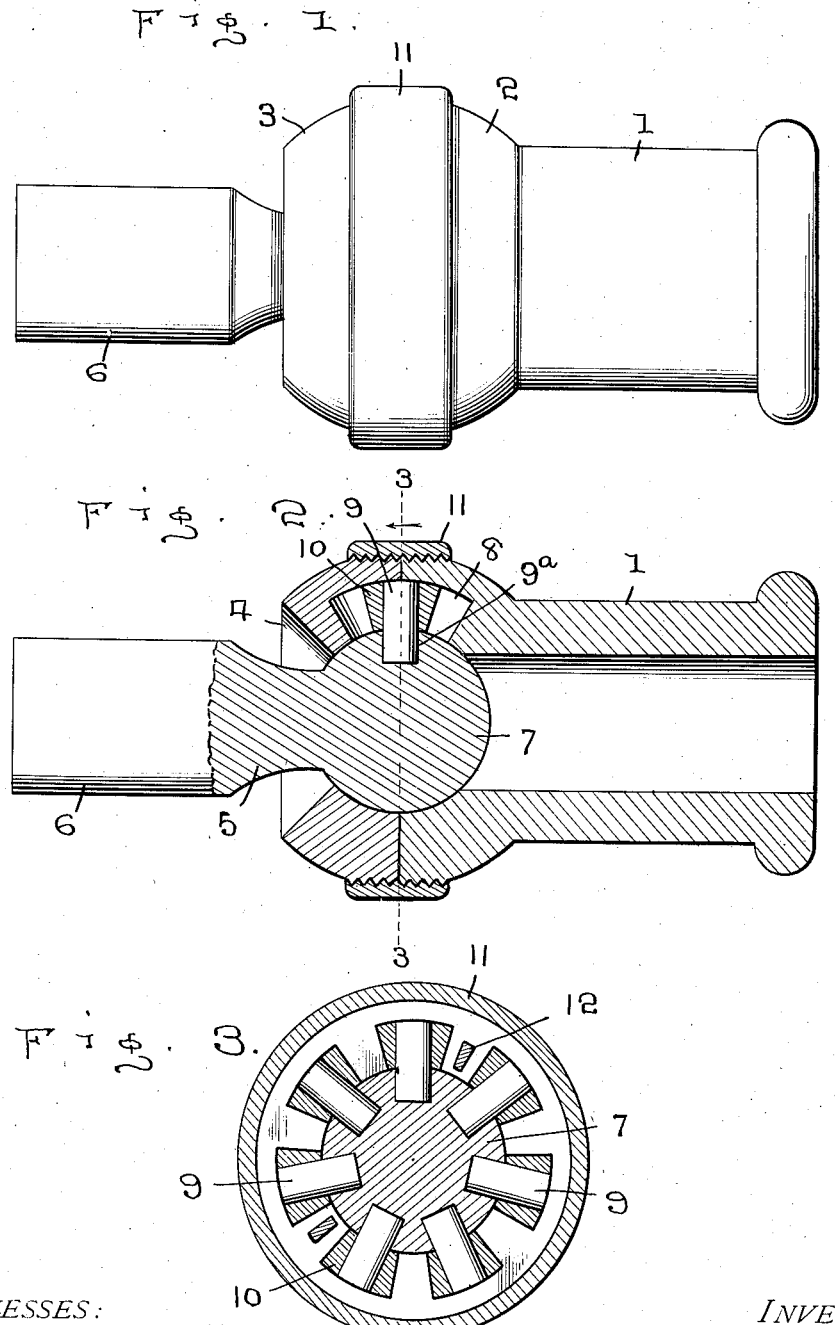

UNITED STATES PATENT OFFICE.

ALLEN H. FETZER, OF GALION, OHIO.

UNIVERSAL JOINT.

1,021,923.  Specification of Letters Patent.  Patented Apr. 2, 1912.

Application filed June 3, 1910. Serial No. 564,764.

*To all whom it may concern:*

Be it known that I, ALLEN H. FETZER, a citizen of the United States, residing at Galion, in the county of Crawford and State of Ohio, have invented certain new and useful Improvements in Universal Joints; and I do hereby declare the following to be a full, clear, and exact description of the invention, such as will enable others skilled in the art to which it appertains to make and use the same.

My invention relates to new and useful improvements in universal joints and my object is, to provide a sectional housing for one portion of a shaft and a ball for the opposite portion of the shaft.

A further object is to provide means for locking the sections of the housing together, and, A further object is to provide means for causing the ball and socket members to rotate in unison and at the same time permit of pivotal action between the ball and socket.

Other objects and advantages will be hereinafter referred to and more particularly pointed out in the specification and claim.

In the accompanying drawings which are made a part of this application, Figure 1 is a side elevation of the ball and socket in their assembled positions. Fig. 2 is a longitudinal central sectional view therethrough. Fig. 3 is a transverse sectional view as seen on line 3—3, Fig. 2. Fig. 4 is a side elevation of one portion of the housing and shaft. Fig. 5 is an end elevation thereof. Fig. 6 is an elevation of a pin journal employed in connection with the bearing. Fig. 7 is a side elevation of a cone bearing coöperating with said pin. Fig. 8 is an end elevation thereof.

Referring to the drawings in which similar reference numerals designate corresponding parts throughout the several views, 1 indicates a sleeve, to one end of which is attached a socket section 2, coöperating with which is an auxiliary socket section 3, said sections when secured together forming a perfect socket member.

The axial center of the auxiliary section 3 is provided with a flared opening 4, through which extends the restricted portion 5 of a shaft or axle section 6, the end of the axle section terminating in a ball 7, which fits the socket formed by the two sections.

Formed on the interior walls of the socket sections 2 and 3 and extending only partially through them are grooves 8, which are preferably elongated with curved ends and preferably seven in number, although a greater or less number may be used, if desired, and one half of each groove is formed in the socket section 2 and the other half in the auxiliary socket section 3.

Preferably carried by the ball are pins or spindles 9, which are equal in number to the number of grooves in the socket, said pins extending beyond the ball a distance equal to the depth of the grooves and on the projecting portions thereof are rotatably mounted cone-shaped sleeves 10, which engage and fit snugly between the side walls of the grooves and to provide a uniform fit between the side walls and cone bearings, said side walls are tapered similar to the taper of the sleeves.

The inner ends of the pins 9 are loosely but snugly set in pockets 9$^a$, so that they can be readily removed from the ball and new ones introduced in their place, when desired.

After the ball has been entered in the auxiliary socket section 3, said auxiliary socket section is placed in registration with the other socket section and secured thereto by means of a band 11, which is interiorly threaded and engages threads on the exterior of the meeting edges of the socket sections.

The two sections of the socket member are kept in proper alinement with each other and held against independent rotation by providing the meeting face of one of the sections with lugs 12, which enter recesses 13 in the opposite socket section and when the lugs are seated within the recesses, it will be readily seen that the sections will be securely held against independent rotation.

By providing the pins and cone shaped sleeves and engaging the same with the grooves, as shown, it will be readily seen that both sections of the shaft or axle will be caused to rotate together, while one of the sections may be swung at various angles to the opposite section, thus particularly adapting the joint for use in connection with the forward axle of a motor propelled vehicle and by this construction, it will be readily seen that the forward axle may be driven, while the parts of the axle carrying the wheels may be swung in the arc of a circle to guide the vehicle.

What I claim is:—

A universal joint comprising a solid ball member provided with a series of spaced radial pockets arranged transversely around the ball and extending only a short distance therein, a socket member adapted to fit around the ball and comprising two sections, said sections being provided upon their inner walls with a series of elongated grooves, said grooves having curved ends and extending only partially through said walls, said grooves also being arranged in position to register with the pockets of the ball when said ball and socket members are assembled, lugs carried by the meeting face of one of said sections, the other of said sections being provided with recesses, said recesses being adapted to receive said lugs and secure said sections against independent rotation, radial pins loosely set in the pockets of said ball and projecting into the grooves of said socket member, cone shaped sleeves fitted on said pins and located in said grooves, said sleeves being adapted to move longitudinally of said grooves, and means for securing said sections together.

In testimony whereof I have signed my name to this specification in the presence of two subscribing witnesses.

ALLEN H. FETZER.

Witnesses:
JOSEPHINE FETZER,
GRACE FETZER.